United States Patent
Cheon et al.

(10) Patent No.: US 12,227,192 B2
(45) Date of Patent: Feb. 18, 2025

(54) APPARATUS AND METHOD FOR CONTROLLING STEERING WHEEL OF AUTONOMOUS VEHICLE

(71) Applicants: Hyundai Motor Company, Seoul (KR); Kia Corporation, Seoul (KR)

(72) Inventors: Seo Hyung Cheon, Gyeonggi-do (KR); Jin Su Jeong, Gyeonggi-do (KR); Eun Young Choi, Seoul (KR); Min Sang Yu, Gyeonggi-do (KR); Rosali Sun Pyun, Gyeonggi-do (KR); Ki Seok Seong, Chungcheongnam-do (KR); Dong Il Yang, Seoul (KR); Woo Jin Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 283 days.

(21) Appl. No.: 17/745,672

(22) Filed: May 16, 2022

(65) Prior Publication Data
US 2023/0092515 A1 Mar. 23, 2023

(30) Foreign Application Priority Data
Sep. 23, 2021 (KR) .................. 10-2021-0125829

(51) Int. Cl.
*B60W 40/08* (2012.01)
*B60W 10/20* (2006.01)
*B60W 50/14* (2020.01)
*B60W 60/00* (2020.01)

(52) U.S. Cl.
CPC ............ *B60W 40/08* (2013.01); *B60W 10/20* (2013.01); *B60W 50/14* (2013.01); *B60W 60/0053* (2020.02); *B60W 2050/146* (2013.01); *B60W 2540/223* (2020.02); *B60W 2540/229* (2020.02)

(58) Field of Classification Search
CPC ...... B60W 40/08; B60W 10/20; B60W 50/14; B60W 60/0053; B60W 2050/146; B60W 2540/223; B60W 2540/229
See application file for complete search history.

(56) References Cited

U.S. PATENT DOCUMENTS

| | | | | |
|---|---|---|---|---|
| 2012/0277954 | A1* | 11/2012 | Kimura | B62D 6/008 701/41 |
| 2013/0009761 | A1* | 1/2013 | Horseman | A61B 5/6893 340/576 |
| 2015/0094899 | A1* | 4/2015 | Hackenberg | B60W 60/0059 701/23 |
| 2017/0106786 | A1* | 4/2017 | Ebina | G08B 5/36 |
| 2017/0197656 | A1* | 7/2017 | Oh | B62D 6/008 |
| 2018/0293893 | A1* | 10/2018 | Yang | B60W 30/18036 |
| 2020/0189500 | A1* | 6/2020 | Recktenwald | B60R 16/037 |

FOREIGN PATENT DOCUMENTS

JP 2008197821 A * 8/2008

* cited by examiner

*Primary Examiner* — Isaac G Smith
*Assistant Examiner* — Nikki Marie M Molina
(74) *Attorney, Agent, or Firm* — Fox Rothschild LLP

(57) ABSTRACT

An apparatus and a method are configured to control a steering wheel of an autonomous driving vehicle. A state of a driver may be monitored during autonomous driving, and at least one of an upward/downward location, a leftward/rightward tilting angle, or an axial movement of the steering wheel of the autonomous driving vehicle may be controlled based on the state of the driver. As a result, danger information may be delivered to the driver through a dual system during autonomous driving.

18 Claims, 11 Drawing Sheets

| Automation level | SAE classification reference | Roles of system | Roles of driver |
|---|---|---|---|
| LEVEL 0 | No automation | Provide temporary emergent intervention or provision of warning | Driver perform all driving functions by driver |
| LEVEL 1 | Driver Assistance | Perform some driving functions such as steering and acceleration/deceleration together while driver who performs driving function in normal operation section is on board | Driver determine operation/timing of level 1 system and perform all operations except for manipulation of handle or acceleration/deceleration pedal (including monitoring of driving environment/driving of vehicle/level 1 system and instantaneous measure for emergent situation) |
| LEVEL 2 | Partial autonomous driving | Perform driving functions such as steering and acceleration/deceleration instead of driver while driver who monitors steering and acceleration/deceleration devices | Driver determine operation/timing of system and perform all operations except for manipulation of handle or acceleration/deceleration pedal (including monitoring of driving environment/driving of vehicle/level 2 system and instantaneous measure for emergent situation) |
| LEVEL 3 | Conditional autonomous driving | Transfer driving control right to driver in situations other than condition, and perform driving functions such as steering and acceleration/deceleration | Driver determine operation/timing of system and perform all operations except for manipulation of handle or acceleration/deceleration pedal (including monitoring of driving environment/driving of vehicle/level 3 system and instantaneous measure for emergent situation) |
| LEVEL 4 | High autonomous driving | Perform all driving functions while driver is on board, except for extremely exceptional situation | Driver may selectively perform measure for emergency situation when transfer of control right of level 4 system is requested |
| LEVEL 5 | Full autonomous driving | Perform all driving functions which system may cope with without any driver | Driver determine only whether system is to be operated and do not perform all driving operations |

FIG.1

APPARATUS AND METHOD FOR CONTROLLING STEERING WHEEL OF AUTONOMOUS VEHICLE

CROSS-REFERENCE TO RELATED APPLICATION

This application claims under 35 U.S.C. § 119(a) the benefit of Korean Patent Application No. 10-2021-0125829, filed in the Korean Intellectual Property Office on Sep. 23, 2021, the entire contents of which are incorporated herein by reference.

BACKGROUND

(a) Technical Field

The present disclosure relates to an apparatus and a method for controlling a steering wheel, more particularly, to an apparatus and method for controlling the steering wheel of an autonomous driving vehicle.

(b) Description of the Related Art

An autonomous driving vehicle requires an ability to adaptively cope with a surrounding situation that changes in real time during driving of the vehicle.

In order to mass-produce and activate autonomous driving vehicles, a determination control function that is reliable is required.

In general, semi-autonomous driving vehicles may decrease driver fatigue by performing driving, braking, and steering of the vehicles instead of a driver or with minimal driver assistance.

Unlike full autonomous driving, in semi-autonomous driving, the driver has to pay attention to driving. For example, the driver must continue gripping a steering wheel.

Certain recent semi-autonomous driving vehicles have been sold while being equipped with a highway driving assisting (HDA) function, a driver status warning (DSW) function of determining a carelessness of a driver, such as dozing off at the wheel, deviation of sights, and the like, and a state disorder of the vehicle to output a warning alarm through a cluster and the like, a driver awareness warning (DAW) function of identifying whether the vehicle performs unstable driving while crossing the lines, using a front camera, and a forward collision-avoidance assisting (FCA) or active emergency brake system (AEBS) function of performing abrupt braking when a front collision is detected.

In a partial autonomous driving system, a driving control right is required to be switched between an autonomous driving system and a driver according to the situation, and switching of the control right between the system and the driver is an important factor in the partial autonomous driving system. Accordingly, in the partial autonomous driving, whether the driver gazes at the front side is a factor of determining responsibility for an accident, and methods of delivering driving danger information to the driver through a dual system is required.

Meanwhile, a steering wheel is an essential component of a vehicle until full autonomous driving is widely implemented.

SUMMARY

An aspect of the present disclosure provides an apparatus and a method for controlling a steering wheel of an autonomous driving vehicle.

Another aspect of the present disclosure provides an apparatus and a method for controlling a steering wheel, by which danger information is delivered to a driver through a dual system during autonomous driving.

Another aspect of the present disclosure provides an apparatus and a method for controlling a steering wheel, by which a sight of a driver is naturally induced by adjusting a direction of the steering wheel.

Another aspect of the present disclosure provides an apparatus and a method for controlling a steering wheel, by which a cope time of a driver is shortened when a control right is switched, by adjusting a location of the steering wheel according to a posture of the driver.

Another aspect of the present disclosure provides an apparatus and a method for controlling a steering wheel, by which convenience is provided in a process of a driver gripping the steering wheel when a control right is switched in partial autonomous driving through control of the steering wheel.

The technical problems to be solved by the present disclosure are not limited to the aforementioned problems, and any other technical problems not mentioned herein will be clearly understood from the following description by those skilled in the art to which the present disclosure pertains.

In an embodiment, an apparatus for controlling a steering wheel is provided. The apparatus includes a monitoring device provided in an autonomous driving vehicle and that monitors a state of a driver during autonomous driving, and a controller that controls at least one of an upward/downward location, a leftward/rightward tilting angle, or an axial movement of the steering wheel of the autonomous driving vehicle, based on the state of the driver.

In an embodiment, the monitoring device may detect a location of a head of the driver, and the controller may control the leftward/rightward tilting angle of the steering wheel such that an axial direction of the steering wheel faces the location of the head of the driver.

In an embodiment, the monitoring device may detect a seating posture of the driver, and the controller may control the axial movement of the steering wheel based on the seating posture of the driver.

In an embodiment, the controller may inform the driver of a request for switching of a control right by moving the steering wheel according to a preset motion when the switching of the control right of the driver is required.

In an embodiment, the apparatus may further include a hands-off detector that detects a hands-off state of the driver, and the controller may control at least one of the upward/downward location, the leftward/rightward tilting angle, or the axial movement of the steering wheel, based on the state of the driver, when the driver is in the hands-off state.

In an embodiment, the monitoring device may include at least one of a camera, a carbon dioxide measuring sensor, a motion sensor, a seat position sensor, or a radar sensor.

In an embodiment, the monitoring device may detect a sleepiness state of the driver, and the controller may bring the steering wheel into contact with a body of the driver by adjusting the upward/downward location of the steering wheel when the sleepiness state of the driver is detected, when switching of a control right of the driver is required.

In an embodiment, the controller may determine a sensitivity, by which the steering wheel is controlled, by recognizing the state of the driver based on at least one of a speed or an acceleration of the autonomous driving vehicle or an external driving environment due to surrounding vehicles, and controls at least one of the upward/downward location, the leftward/rightward tilting angle, or the axial direction of the steering wheel according to the sensitivity.

In an embodiment, the controller may determine the sensitivity in consideration of the state of the driver.

In an embodiment, the controller may output a preset signal through a display or a lamp provided in the steering wheel.

In an embodiment, the controller may adjust the output signal based on at least one of the external driving environment of the autonomous driving vehicle or the state of the driver.

According to an embodiment of the present disclosure, a method for controlling a steering wheel includes monitoring, by a monitoring device provided in an autonomous driving vehicle, a state of a driver during autonomous driving, and controlling, by a controller, at least one of an upward/downward location, a leftward/rightward tilting angle, or an axial movement of the steering wheel of the autonomous driving vehicle, based on the state of the driver.

In an embodiment, the monitoring of the state of the driver by the monitoring device may include detecting, by the monitoring device, a location of a head of the driver, and the controlling of at least one of an upward/downward location, a leftward/rightward tilting angle, or an axial movement of the steering wheel of the autonomous driving vehicle by the controller may include controlling, by the controller, the leftward/rightward tilting angle of the steering wheel such that an axial direction of the steering wheel faces the location of the head of the driver.

In an embodiment, the monitoring of the state of the driver by the monitoring device may include detecting, by the monitoring device, a seating posture of the driver, and the controlling of at least one of an upward/downward location, a leftward/rightward tilting angle, or an axial movement of the steering wheel of the autonomous driving vehicle by the controller may include controlling, by the controller, the axial movement of the steering wheel based on the seating posture of the driver.

In an embodiment, the controlling of at least one of an upward/downward location, a leftward/rightward tilting angle, or an axial movement of the steering wheel of the autonomous driving vehicle by the controller may include informing, by the controller, the driver of a request for switching of a control right by moving the steering wheel according to a preset motion when the switching of the control right of the driver is required.

In an embodiment, the method may further include detecting, by the hands-off detector, detecting a hands-off state of the driver, and the controlling of at least one of an upward/downward location, a leftward/rightward tilting angle, or an axial movement of the steering wheel of the autonomous driving vehicle by the controller may include controlling, by the controller, at least one of the upward/downward location, the leftward/rightward tilting angle, or the axial movement of the steering wheel, based on the state of the driver, when the driver is in the hands-off state.

In an embodiment, the monitoring of the state of the driver by the monitoring device may include detecting, by the monitoring device, a sleepiness state of the driver, and the controlling of at least one of an upward/downward location, a leftward/rightward tilting angle, or an axial movement of the steering wheel of the autonomous driving vehicle by the controller may include bringing, by the controller, the steering wheel into contact with a body of the driver by adjusting the upward/downward location of the steering wheel when the sleepiness state of the driver is detected, when switching of a control right of the driver is required.

In an embodiment, the controlling of at least one of an upward/downward location, a leftward/rightward tilting angle, or an axial movement of the steering wheel of the autonomous driving vehicle by the controller may include determining, by the controller, a sensitivity by which the steering wheel is controlled, by recognizing the state of the driver based on at least one of a speed or an acceleration of the autonomous driving vehicle or an external driving environment due to surrounding vehicles, and controlling, by the controller, at least one of the upward/downward location, the leftward/rightward tilting angle, or the axial direction of the steering wheel according to the sensitivity.

In an embodiment, the determining of a sensitivity by which the steering wheel is controlled, by recognizing the state of the driver by the controller may include determining, by the controller, the sensitivity in consideration of the state of the driver.

In an embodiment, the controlling of at least one of an upward/downward location, a leftward/rightward tilting angle, or an axial movement of the steering wheel of the autonomous driving vehicle by the controller may include outputting, by the controller, a preset signal through a display or a lamp provided in the steering wheel.

BRIEF DESCRIPTION OF THE DRAWINGS

The above and other objects, features and advantages of the present disclosure will be more apparent from the following detailed description taken in conjunction with the accompanying

DRAWINGS

Figure 2:
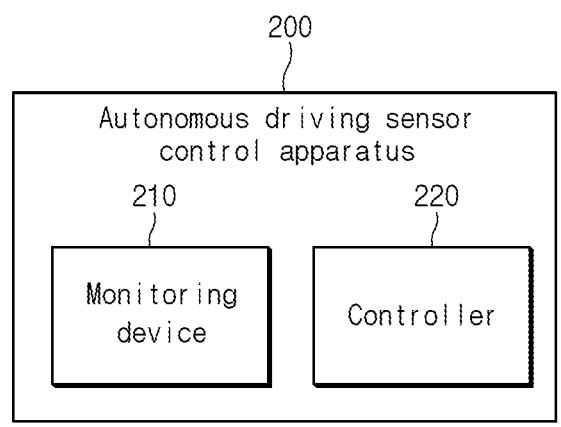
Figure 3:
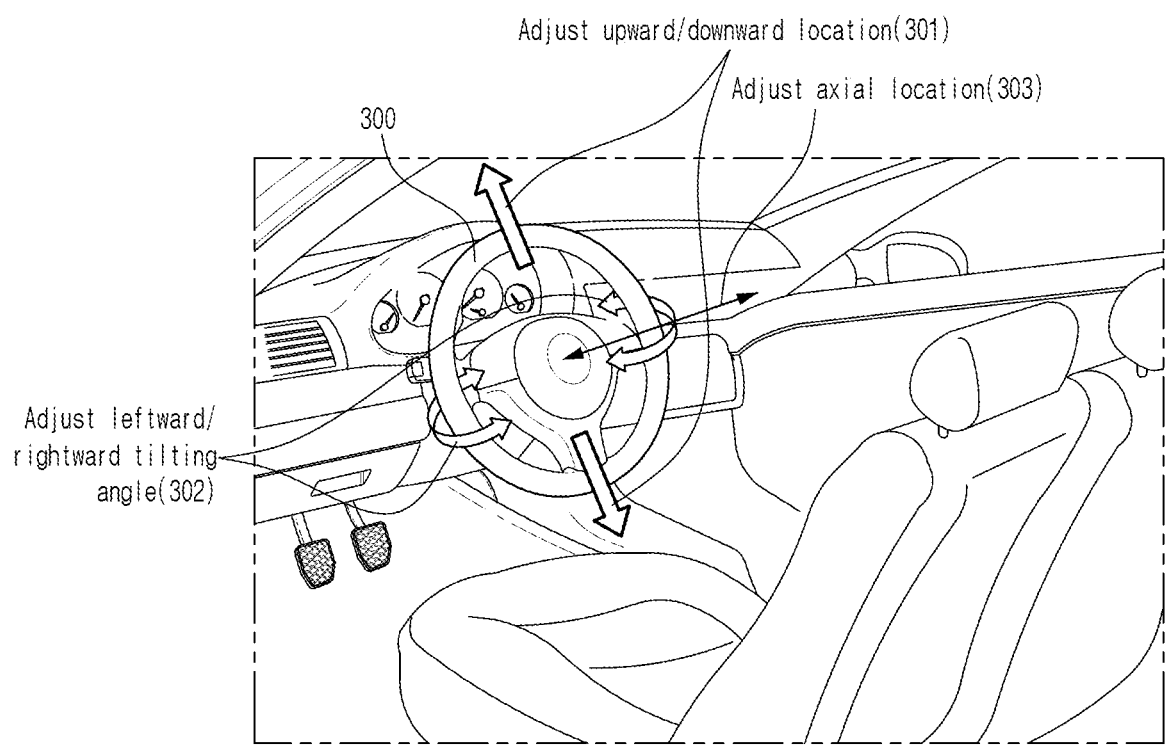
Figure 4A:
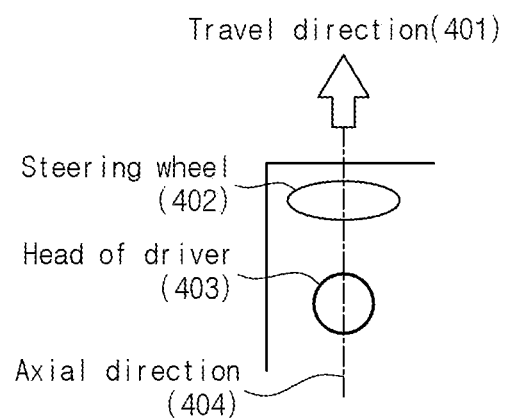
Figure 4B:
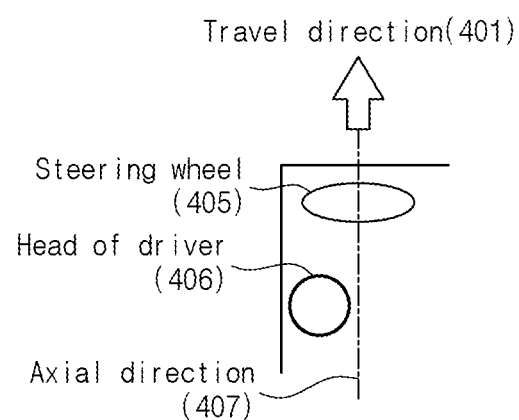
Figure 4C:
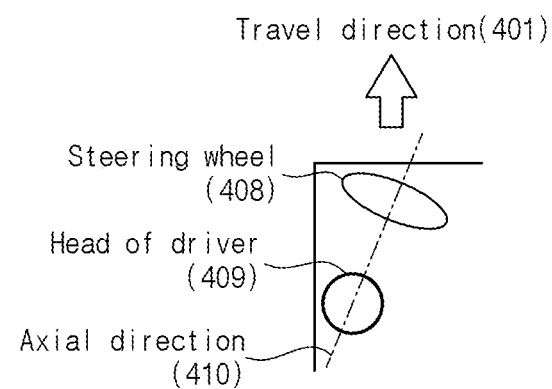
Figure 5A:
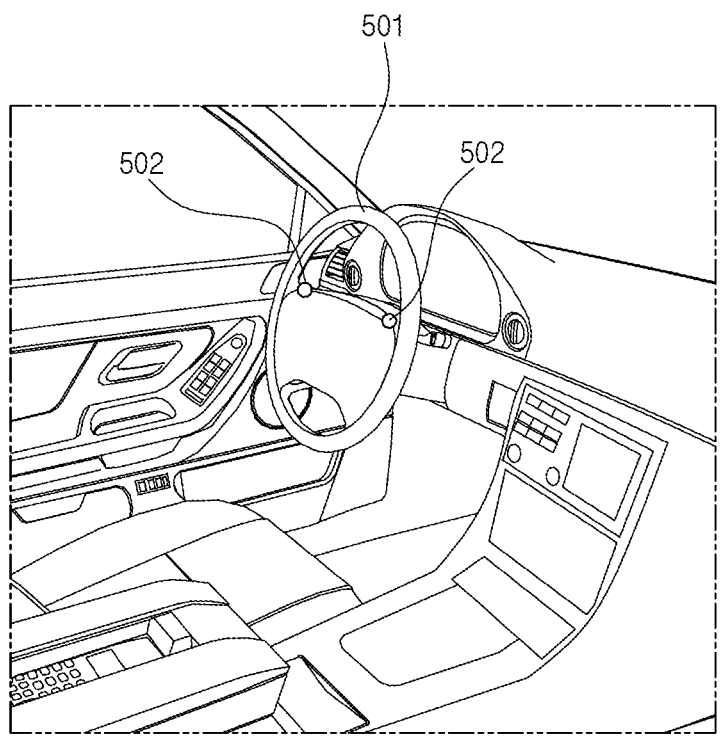
Figure 5B:
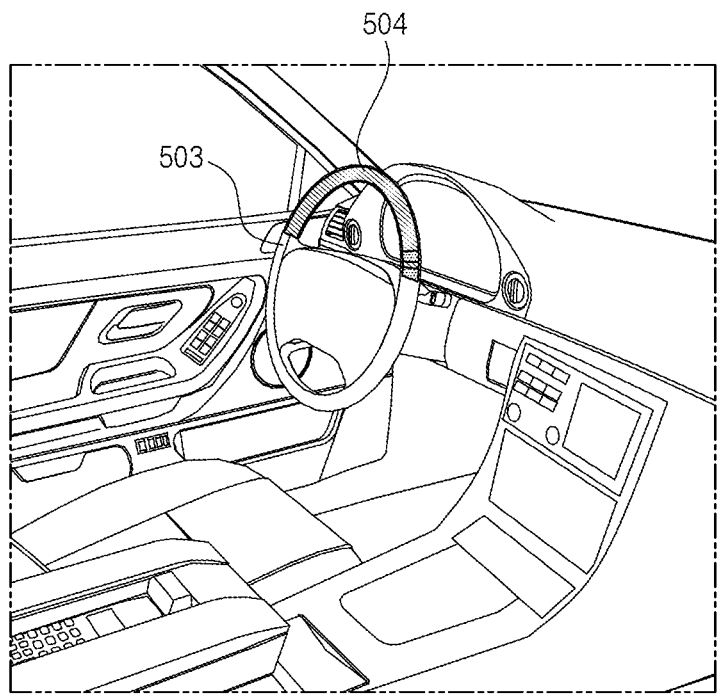
Figure 5C:
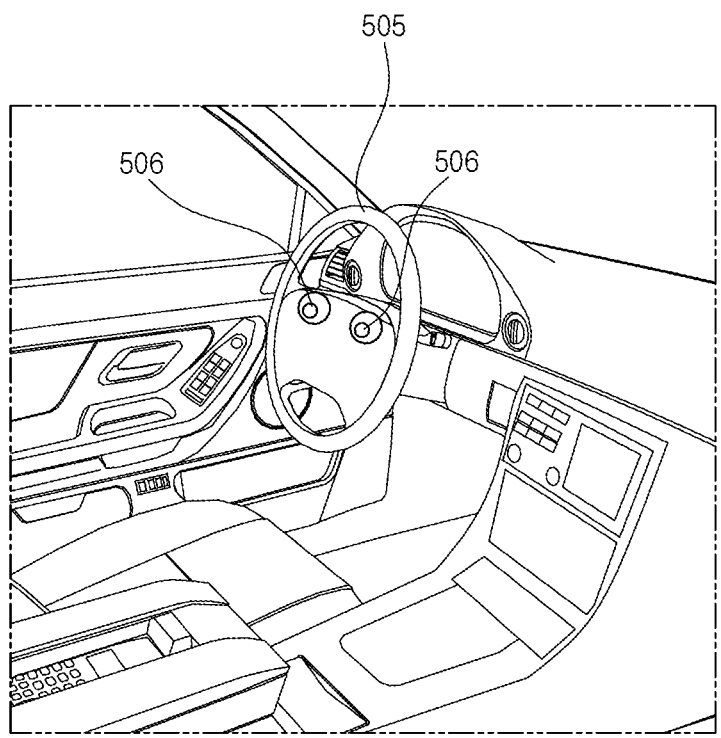
Figure 5D:
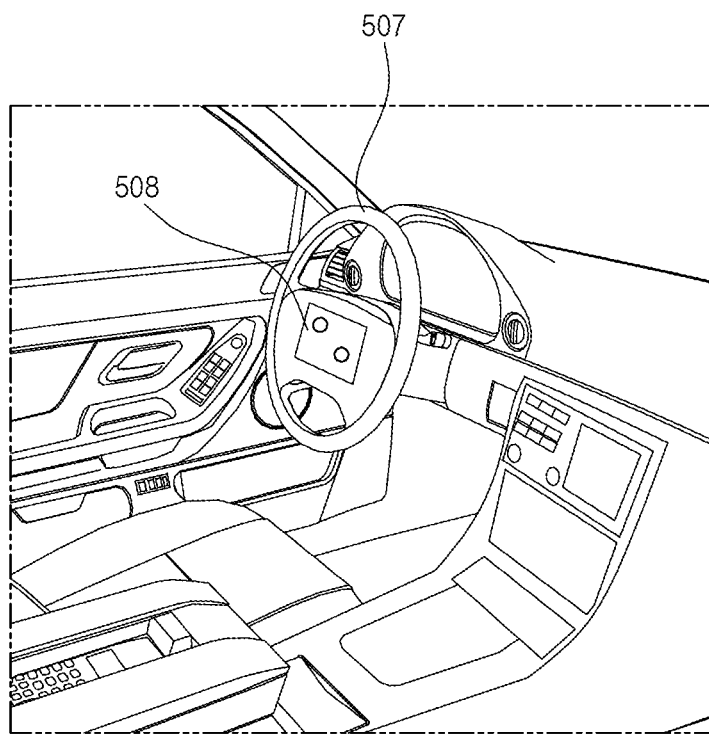
Figure 6:
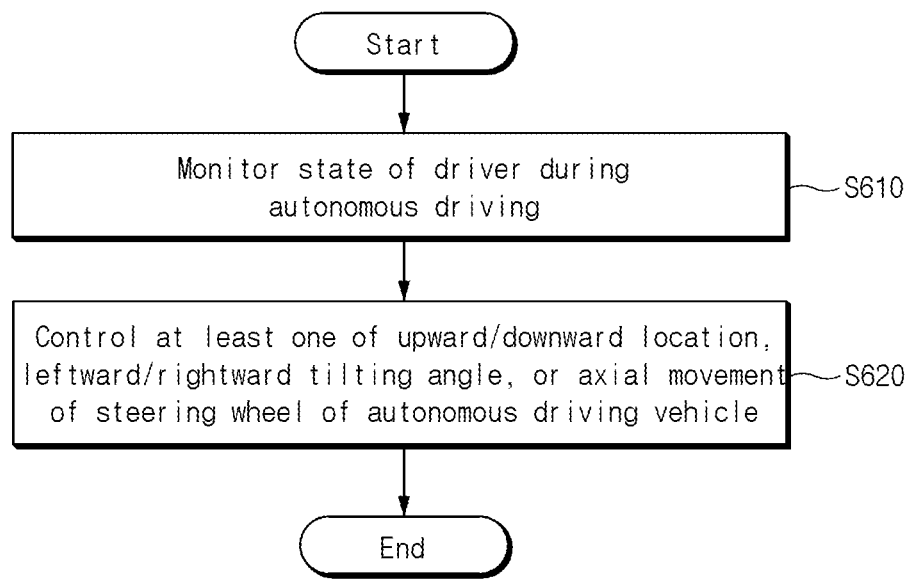

FIG. 1 is a table, in which automation levels of an autonomous driving vehicle are defined;

FIG. 2 is a block diagram illustrating an apparatus for controlling a steering wheel according to an embodiment of the present disclosure:

FIG. 3 is a view illustrating control of a steering wheel by an apparatus for controlling a steering wheel according to an embodiment of the present disclosure:

FIGS. 4A to 4C are views illustrating control of a leftward/rightward tilting angle of a steering wheel by an apparatus for controlling a steering wheel according to an embodiment of the present disclosure;

FIGS. 5A to 5D are views illustrating output of a preset signal through a display or a lamp provided in a steering wheel, by an apparatus for controlling a steering wheel according to an embodiment of the present disclosure; and FIG. 6 is a flowchart illustrating a method for controlling a steering wheel according to an embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary; the word "comprise" and variations such as "comprises" or "comprising" will be understood to imply the inclusion of stated elements but not the exclusion of any other elements. In addition, the terms "unit", "-er", "or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

The terms, such as first, second, A, B, (a), (b) or the like may be used herein when describing components of the present disclosure. The terms are provided only to distinguish the components from other components, and the essences, sequences, orders, and the like of the components are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, embodiments of the present disclosure will be described in detail with reference to FIGS. 1 to 6.

FIG. 1 is a table, in which automation levels of an autonomous driving vehicle are defined.

An autonomous driving vehicle refers to a vehicle that travels by itself while determining a danger by recognizing a driving environment by itself, and minimizing a driving operation by a driver while controlling a driving path.

Ultimately, an autonomous driving vehicle refers to a vehicle that may be driven, manipulated, and parked without any influence of a person, and a vehicle in a state, in which an autonomous driving technology that is a core basis of the autonomous driving vehicle, that is, an ability of driving a vehicle without active control or monitoring by a driver, is maximally developed.

Referring to FIG. 1, in automation levels LEVEL 0 to LEVEL 2, a driving environment is monitored by a driver. Meanwhile, in automation levels LEVEL 3 to LEVEL 5, the driving environment is monitored by an automated driving system.

However, the concept of currently released autonomous driving vehicles may include an automation level corresponding to an intermediate level that proceeds to an autonomous driving vehicle of a perfect meaning, and corresponds to a target-oriented concept that assumes mass-production and commercialization of full autonomous driving vehicles.

An autonomous driving control method according to the present disclosure may be applied to an autonomous driving vehicle corresponding to LEVEL 2 (partial autonomous driving) and LEVEL 3 (conditional autonomous driving) of the automation levels of the autonomous driving illustrated in FIG. 1, but the present disclosure is not limited thereto, and may be applied to an autonomous driving vehicle that supports a plurality of various automation levels.

The automation levels of autonomous driving vehicles correspond to those of the Society of Automotive Engineers (SAE), which is a vehicle technician association in the United States.

FIG. 2 is a block diagram illustrating an apparatus for controlling a steering wheel according to an embodiment of the present disclosure.

Referring to FIG. 2, an apparatus 200 for controlling a steering wheel may include a monitoring device 210 and a controller 220.

The monitoring device 210 may be provided in an autonomous driving vehicle, and may monitor a state of a driver during autonomous driving.

The autonomous driving here may mean autonomous driving of LEVEL 2 or more of the automation levels of the autonomous driving illustrated in FIG. 1, in which a hands-off state of the driver is allowed.

As an example, the monitoring device 210 may be connected to an autonomous driving system, and may acquire information on whether the vehicle is in an autonomous driving state from the autonomous driving system.

As an example, the monitoring device 210 may include at least one of a camera, a carbon dioxide measuring sensor, a motion sensor, a seat position sensor, or a radar sensor.

As an example, the monitoring device 210 may be provided on a front side of the driver, and may detect that the driver identifies a front side during autonomous driving, through a camera that acquires an image of the driver.

As an example, the monitoring device 210 may detect an eye of the driver through analysis of an image based on the acquired image of the driver and identify a direction of a sight of the driver to detect that the driver identifies the front side.

As an example, the monitoring device 210 may detect that the driver identifies the front side during autonomous driving, and may calculate a frequency of the driver identifying the front side.

The monitoring device 210 may detect a sleepiness state of the driver.

As an example, the monitoring device 210 may measure an amount or a concentration of carbon dioxide in an interior of the vehicle, through a carbon dioxide measuring sensor in the interior of the vehicle.

As an example, the monitoring device 210 may recognize the sleepiness state of the driver by comparing the amount or the concentration of carbon dioxide in the interior of the vehicle with a reference value, or based on a change value of the amount or the concentration in the interior of the vehicle.

As another example, the monitoring device 210 may recognize the sleepiness state of the driver through a heat rate, a brain wave, or an image.

The monitoring device 210 may detect a location of a head of the driver.

As an example, the monitoring device 210 may detect a location of the head of the driver through a motion sensor.

The monitoring device 210 may detect the location of the head of the driver through a motion of the head of the driver, which is detected through the motion sensor.

As another example, the monitoring device 210 may detect the location of the head of the driver through an image obtained by the camera or the radar sensor.

The monitoring device 210 may detect a seating posture of the driver.

As an example, the monitoring device 210 may detect the seating posture of the driver through a seat position sensor.

As an example, the monitoring device 210 may detect at least one of a forward/rearward location or an upward/downward height of a seat or an angle of a backrest of a seat, through the seat position sensor.

As an example, the monitoring device 210 may detect the seating posture of the driver, based on at least one of the forward/rearward location or the upward/downward height of the seat or the angle of the backrest of the seat, which has been detected.

As another example, the monitoring device 210 may detect the seating posture of the driver through the image obtained by the camera, the motion sensor, or the radar sensor.

As an example, the monitoring device 210 may identify whether the driver is breathing or an amount of respirations of the driver, through the radar sensor.

As an example, the monitoring device 210 may identify whether the driver is respiring or the amount of respirations of the driver, by detecting a precise movement of the abdomen or the chest of the driver, through the radar sensor.

The monitoring device 210 may be connected to the controller 220 through wireless or wired communication, and may transmit information on the monitored state of the driver to the controller 220.

The controller 220 may perform an overall control such that the elements may normally perform their functions. The controller 130 may be implemented in a form of hardware, may be implemented in a form of software, or may be implemented in a form of a combination of hardware and software. Preferably, the controller 220 may be implemented by a microprocessor, but the present disclosure is not limited thereto. Furthermore, the controller 220 may perform various data processing and calculations, which will be described below.

As an example, the controller 220 may include an electronic control unit (ECU), a micro controller unit (MCU), an advanced driver assistance system (ADAS) integrated controller, or another low-level controller mounted on the vehicle.

The controller 220 may control at least one of an upward/downward location, a leftward/rightward tilting angle, or an axial movement of the steering wheel of the autonomous driving vehicle, based on a state of the driver.

As an example, the controller 220 may control at least one of the upward/downward location, the leftward/rightward tilting angle, or the axial movement of the steering wheel, through a known technology, for example, of transmitting a rotational force to a screw connected to the steering wheel or a steering column.

Here, the leftward/rightward tilting of the steering wheel may mean a rotation of a central shaft of an existing steering wheel in the leftward/rightward direction about a specific point on the central shaft of the steering wheel.

As an example, the controller 220 may control the leftward/rightward tilting angle of the steering wheel such that an axial direction of the steering wheel faces the location of the head of the driver.

As an example, the controller 220 may control the leftward/rightward tilting angle of the steering wheel such that the axial direction of the steering wheel faces the location of the head of the driver when the head of the driver deviates from the center of the seat.

Although not illustrated, the apparatus 200 for controlling the steering wheel may further include a hands-off detector that detects a hands-off state of the driver.

As an example, the controller 220 may control at least one of the upward/downward location, the leftward/rightward tilting angle, or the axial movement of the steering wheel, based on the state of the driver, when the driver is in the hands-off state.

As an example, because the driver may receive a control right immediately after switch of the control right is required, even though the controller 220 does not control a movement of the steering wheel when the driver is in a hands-on state, it may control at least one of the upward/downward location, the leftward/rightward tilting angle, or the axial movement of the steering wheel only when the driver is in the hands-off state.

Because the leftward/rightward tilting angle of the steering wheel is controlled to face the location of the head of the driver, the driver may make a prompt reaction when it is necessary to switch the control right.

As an example, the controller 220 may control the axial movement of the steering wheel based on the seating posture of the driver.

As an example, the controller 220 may control the steering wheel to move toward the driver along the axial direction thereof when determining that the seating posture of the driver is leaned to a rear side with reference to a preset reference.

As an example, the controller 220 may control the steering wheel to move toward the driver along the axial direction thereof when determining that the seating posture of the driver is abnormally leaned to a front side with reference to a preset reference.

As an example, the controller 220 may inform the driver of a request for switching of a control right by moving the steering wheel according to a preset motion when switching of the control right of the driver is required.

As an example, the preset motion may be a motion according to upward/downward movement or leftward/rightward movement of the steering wheel, or a combination thereof, and may be a motion for attracting driver's eye.

As the controller 220 moves the steering wheel according to the preset motion, the driver may recognize that switching of the control right is requested while viewing the motion of the steering wheel.

As an example, the controller 220 may bring the steering wheel into contact with a body of the driver, by adjusting the upward/downward location of the steering wheel, if a sleepiness state of the driver is detected when the switching of the control right of the driver is required.

When the steering wheel moves downwards, it may touch a knee or thigh portion of the driver.

As an example, the controller 220 may deliver a direct signal to the driver by repeating touches to the body of the driver while repeating upward/downward movements of the steering wheel.

The driver may recognize a request for switching of the control right even in a sleepiness situation as the steering wheel touches the body of the driver.

As an example, the controller 220 may determine a sensitivity, by which the steering wheel is controlled, by recognizing the state of the driver based on at least one of a speed or an acceleration of the autonomous driving vehicle or an external driving environment due to surrounding vehicles, and may control at least one of the upward/downward location, the leftward/rightward tilting angle, or the axial direction of the steering wheel according to the sensitivity.

As an example, the controller 220 may not control the steering wheel when the driver switches off a steering wheel control function.

As an example, the controller 220 may determine the sensitivity in consideration of whether another vehicle is present in a specific range around the autonomous driving vehicle, a time to collision with a preceding vehicle, an expected time for a collision with a following vehicle, whether another vehicle is present in a specific range of an adjacent lane, a speed range of the autonomous driving vehicle, or an acceleration range of the autonomous driving vehicle.

As an example, the controller 220 may set the sensitivity to a low sensitivity when a condition in which another vehicle is not present in a specific range around the autonomous driving vehicle, a condition in which a speed of the autonomous driving vehicle is 60 km/h, a condition in which an acceleration of the autonomous driving vehicle is 2 g or less, or a condition in which two or more thereof are coupled is satisfied.

As an example, the controller 220 may set the sensitivity to a sensitivity of an intermediate degree when a condition in which a prediction time for a collision with a preceding vehicle is 2 seconds or more, a condition in which another vehicle is present in a specific range of an adjacent lane, a condition in which a speed of the autonomous vehicle is 60 km/h to 100 km/h, a condition in which an acceleration of the autonomous driving vehicle is 2 g to 4 g, or a condition in which two or more thereof are coupled is satisfied.

As an example, the controller 220 may set the sensitivity to a sensitivity of an intermediate degree when a condition in which a prediction time for a collision with a preceding vehicle is less than 2 seconds, a condition in which another vehicle is present in a specific range of an adjacent lane and a blind spot detection (BSD) lamp of the autonomous driving vehicle is turned on, a condition in which a speed of the autonomous vehicle is 100 km/h or more, a condition in which a speed of the autonomous driving vehicle is 4 g or more, or a condition in which two or more thereof are coupled is satisfied.

Here, the terms that distinguish the borders of not less than, more than, not more than, and less than may be changed and applied to the embodiments that include or do not include border values according to the embodiments.

Here, g may mean about 9.8 m/s^2 that is a gravitational acceleration.

As an example, the controller 220 may control the steering wheel by adjusting a gap between a time at which the state of the driver is recognized, and a time at which control of the steering wheel is performed, a degree by which the steering wheel moves, or a speed at which the steering wheel moves, according to the sensitivity.

As an example, the controller 220 may determine the sensitivity in consideration of the state of the driver.

As an example, the controller 220 may recognize a condition of the driver through the monitored state of the driver.

As an example, the controller 220 may determine that the condition of the driver is normal when the driver is monitored to do an act, such as manipulation of a mobile phone.

As an example, the controller 220 may lower the sensitivity when it is determined that the driver is in a normal condition. It may be because it takes a relatively short time in determining a situation when the driver is in a normal condition.

In contrast, the controller 220 may increase the sensitivity when it is determined that the driver is not in a normal condition.

As an example, the controller 220 may output a preset signal through a display or a lamp provided in the steering wheel.

The steering wheel may include a lamp provided with a light emitting body to provide a graphic element, a rim upper end display, a center circle display, or a center common display.

The controller 220 may naturally induce the sight of the driver by outputting a preset visual signal through the lamp, the rim upper end display, the center circle display, or the center common display.

Outputting of the preset signal through the display or the lamp provided in the steering wheel by the controller 220 will be described later in detail through FIGS. 5A to 5D.

As an example, the controller 220 may adjust an output signal based on at least one of an external driving environment of the autonomous driving vehicle or the state of the driver.

As an example, the controller 220 may adjust a brightness, a light emitting area, a color, or a shape of an output visual signal according to at least one of the external driving environment of the autonomous driving vehicle, an act of the driver, or a concentration of the driver. As an example, the controller 220 may adjust the brightness of the output visual signal to be brighter, or the light emitting area to be wider when it is determined that the driver does another act, such as manipulation of a mobile phone, or a concentration of the driver is lowered.

As an example, the controller 220 may adjust an on/off period of the output visual signal according to at least one of the external driving environment of the autonomous driving vehicle, the act of the driver, or the concentration of the driver, when the visual signal includes the on/off period.

As an example, the controller 220 may adjust the on/off period of the output visual signal to be shorter when it is determined that the driver does another act, such as manipulation of a mobile phone, or a concentration of the driver is lowered.

FIG. 3 is a view illustrating control of a steering wheel by an apparatus for controlling a steering wheel according to an embodiment of the present disclosure.

Referring to FIG. 3, the apparatus 200 for controlling a steering wheel may adjust an upward/downward location of the steering wheel 300 (301), may adjust a leftward/rightward tilting angle of the steering wheel 300 (302), or may adjust a forward/rearward location along the axial direction of the steering wheel 300 (303).

As an example, the apparatus 200 for controlling a steering wheel may adjust the upward/downward location of the steering wheel 300 (301), may adjust the leftward/rightward tilting angle of the steering wheel 300 (302), or may adjust the forward/rearward location along the axial direction of the steering wheel 300 (303), based on the location of the head or the seating posture of the driver, which has been monitored.

As an example, the apparatus 200 for controlling a steering wheel may adjust upward the location of the steering wheel when it is determined that the monitored location of the head of the driver is above the axial direction of the steering wheel, and may lower the location of the steering wheel when it is determined that the location of the head of the driver is below the axial direction of the steering wheel.

As an example, the apparatus 200 for controlling a steering wheel may adjust the leftward/rightward tilting angle of the steering wheel to the left side when it is determined that the monitored location of the head of the driver is on the left side of the axial direction of the steering wheel, and may adjust the leftward/rightward tilting angle of the steering wheel to the right side when it is determined that the location of the head of the driver is on the right side of the axial direction of the steering wheel.

For example, the apparatus 200 for controlling a steering wheel may move the location of the steering wheel toward the driver along the axial direction when it is determined that the monitored seating posture of the driver is inclined rearwards, and may move the location of the steering wheel toward an opposite direction to the driver along the axial direction when it is determined that the seating posture of the driver is inclined forwards.

FIGS. 4A to 4C are views illustrating control of a leftward/rightward tilting angle of a steering wheel by an apparatus for controlling a steering wheel according to an embodiment of the present disclosure.

FIG. 4A is a view illustrating that the axial direction 404 of the steering wheel 402 faces the location of the head 403 of the driver.

The proceeding direction 401 is a front side of the vehicle that proceeds when the vehicle travels.

In this case, because the axial direction 404 faces the location of the head 403 of the driver, the apparatus 200 for controlling a steering wheel may not adjust the leftward/rightward tilting angle of the steering wheel 402.

FIG. 4B is a view illustrating that the axial direction 407 of the steering wheel 405 does not face the location of the head 406 of the driver.

In this case, because the axial direction 407 faces the location of the head 406 of the driver, the apparatus 200 for controlling a steering wheel may adjust the leftward/rightward tilting angle of the steering wheel 402 such that the axial direction 407 faces the location of the head 406 of the driver.

FIG. 4C is a view illustrating that the leftward/rightward tilting angle of the steering wheel is adjusted such that the axial direction 410 of the steering wheel 408 faces the location of the head 409 of the driver.

The apparatus 200 for controlling the steering wheel may cause the axial direction 410 to face the location of the head 409 of the driver by adjusting the leftward/rightward tilting angle of the steering wheel 408.

FIGS. 5A to 5D are views illustrating output of a preset signal through a display or a lamp provided in a steering wheel, by an apparatus for controlling a steering wheel according to an embodiment of the present disclosure.

FIG. 5A illustrates a lamp 502 provided in the steering wheel 501.

The lamp 502 may be provided at a location of the steering wheel 501 that is different from that illustrated in FIG. 5A, and another number of lamps may be provided.

The apparatus 200 for controlling a steering wheel may induce the sight of the driver by outputting the visual signal through a change in the color of the lamp 502 or an on/off period in the hands-off state during autonomous driving.

As an example, the apparatus 200 for controlling a steering wheel may adjust the color or the on/off period of the lamp 502 based on at least one of the external driving environment of the autonomous driving vehicle or the state of the driver.

FIG. 5B illustrates the display 504 provided at an upper end of a rim of the steering wheel 503.

The display 504 may be provided at an upper end of the steering wheel 503 to turn on a portion of the display 504 while changing the light emitting area thereof.

The apparatus 200 for controlling a steering wheel may induce the sight of the driver by outputting the visual signal through the change in the color, the on/off period, or the change in the light emitting area of the display 504 in the hands-off state during autonomous driving.

As an example, the apparatus 200 for controlling a steering wheel may adjust the color or the on/off period, or the light emitting area of the display 504 based on at least one of the external driving environment of the autonomous driving vehicle or the state of the driver.

FIG. 5C illustrates the circular display 506 provided at a central portion of the steering wheel 505.

Two circular displays 506 are provided at a central portion of the steering wheel 505, and a graphic element having a shape that is similar to an iris including a small circle may be disposed at a center portion of the circular display 506.

The apparatus 200 for controlling a steering wheel may induce the sight of the driver by outputting the visual signal through the change in the color, the on/off period, or the change in the size of the circle at the center portion of the circular display 506 in the hands-off state during autonomous driving.

As an example, the apparatus 200 for controlling a steering wheel may adjust the color, the on/off period, or the size of the circle at the central portion of the circular display 506 based on at least one of the external driving environment of the autonomous driving vehicle or the state of the driver.

FIG. 5D illustrates the display 508 provided at a central portion of the steering wheel 507.

The display 508 may be provided at a central portion of the steering wheel 507, and may display a graphic element including a specific shape.

The apparatus 200 for controlling a steering wheel may induce the sight of the driver by outputting a specific shape on the display 508 at random or moving the output shape in the hands-off state during autonomous driving.

As an example, the apparatus 200 for controlling a steering wheel may adjust a kind of a shape output on the display 508 or a speed, at which the output shape moves, based on at least one of the external driving environment of the autonomous driving vehicle or the state of the driver.

FIG. 6 is a flowchart illustrating a method for controlling a steering wheel according to an embodiment of the present disclosure.

Referring to FIG. 6, a method for controlling a steering wheel may include an operation S610 of monitoring a state of a driver during autonomous driving, and an operation S620 of controlling at least one of an upward/downward location, a leftward/rightward tilting angle, or an axial movement of the steering wheel of the autonomous driving vehicle, based on the state of the driver.

The operation S610 of monitoring the state of the driver during autonomous driving may be performed by the monitoring device 210.

As an example, the operation S610 of monitoring the state of the driver may include an operation of detecting, by the monitoring device 210, a location of the head of the driver.

As an example, the operation S610 of monitoring the state of the driver may include an operation of detecting, by the monitoring device 210, a seating posture of the driver.

As an example, the operation S610 of monitoring the state of the driver may include an operation of detecting, by the monitoring device 210, a sleepiness state of the driver.

The operation S620 of controlling at least one of the upward/downward location, the leftward/rightward tilting angle, or the axial movement of the steering wheel of the autonomous driving vehicle, based on the state of the driver may be performed by the controller 220.

As an example, the operation S620 of controlling at least one of the upward/downward location, the leftward/rightward tilting angle, or the axial movement of the steering wheel of the autonomous driving vehicle, based on the state of the driver may include an operation of controlling, by the controller 220, the leftward/rightward tilting angle of the steering wheel such that an axial direction of the steering wheel faces the location of the head of the driver.

As an example, the operation S620 of controlling at least one of the upward/downward location, the leftward/rightward tilting angle, or the axial movement of the steering wheel of the autonomous driving vehicle, based on the state of the driver may include an operation of controlling, by the controller 220, the axial movement of the steering wheel based on the seating posture of the driver.

As an example, the operation S620 of controlling at least one of the upward/downward location, the leftward/rightward tilting angle, or the axial movement of the steering wheel of the autonomous driving vehicle, based on the state of the driver may include an operation of informing, by the controller 220, the driver of a request for switching of a control right by moving the steering wheel according to a preset motion when the switching of the control right of the driver is required.

Although not illustrated, the method for controlling the steering wheel may further include an operation of detecting a hands-off state of the driver.

As an example, the operation S620 of controlling at least one of the upward/downward location, the leftward/rightward tilting angle, or the axial movement of the steering wheel of the autonomous driving vehicle, based on the state of the driver may include an operation of controlling, by the controller 220, at least one of the upward/downward location, the leftward/rightward tilting angle, or the axial movement of the steering wheel, based on the state of the driver, when the driver is in the hands-off state.

As an example, the operation S620 of controlling at least one of the upward/downward location, the leftward/rightward tilting angle, or the axial movement of the steering wheel of the autonomous driving vehicle, based on the state of the driver may include an operation of bringing, by the controller 220, the steering wheel into contact with the body of the driver by adjusting the upward/downward location of the steering wheel when the sleepiness state of the driver is detected, when switching of a control right of the driver is required.

As an example, the operation S620 of controlling at least one of an upward/downward location, a leftward/rightward tilting angle, or an axial movement of the steering wheel of the autonomous driving vehicle by the controller may include an operation of determining, by the controller 220, a sensitivity, by which the steering wheel is controlled, by recognizing the state of the driver based on at least one of a speed or an acceleration of the autonomous driving vehicle or an external driving environment due to surrounding vehicles, and an operation of controlling, by the controller 220, at least one of the upward/downward location, the leftward/rightward tilting angle, or the axial direction of the steering wheel according to the sensitivity.

As an example, the operation of determining the sensitivity may include an operation of, by the controller 220, determining the sensitivity in consideration of the state of the driver.

As an example, the operation S620 of controlling at least one of the upward/downward location, the leftward/rightward tilting angle, or the axial movement of the steering wheel of the autonomous driving vehicle, based on the state of the driver may include an operation of outputting, by the controller 220, a preset signal through a display or a lamp provided in the steering wheel.

Accordingly, the steps of the method or algorithm described in relation to the embodiments of the present disclosure may be implemented directly by hardware executed by the processor, a software module, or a combination thereof. The software module may reside in a storage medium (that is, the memory and/or the storage), such as a RAM memory, a flash memory, a ROM memory, an EPROM memory, an EEPROM memory, a register, a hard disk, a detachable disk, or a CD-ROM.

The exemplary storage medium is coupled to the processor, and the processor may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

The effects of the apparatus and the method for controlling a steering wheel according to the present disclosure will be described as follows.

According to at least one of the embodiments of the present disclosure, an apparatus and a method for controlling a steering wheel of an autonomous driving vehicle may be provided.

According to at least one of the embodiments of the present disclosure, an apparatus and a method for controlling a steering wheel, by which danger information is delivered to a driver through a dual system during autonomous driving may be provided.

According to at least one of the embodiments of the present disclosure, an apparatus and a method for controlling a steering wheel, by which a sight of a driver is naturally induced by adjusting a direction of the steering wheel may be provided.

According to at least one of the embodiments of the present disclosure, an apparatus and a method for controlling a steering wheel, by which a cope time of a driver is shortened when a control right is switched, by adjusting a location of the steering wheel according to a posture of the driver may be provided.

According to at least one of the embodiments of the present disclosure, an apparatus and a method for controlling a steering wheel, by which convenience is provided in a process of a driver gripping the steering wheel when a control right is switched in partial autonomous driving through control of the steering wheel may be provided.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure

What is claimed is:

1. An apparatus for controlling a steering wheel, the apparatus comprising:
   a monitoring device provided in an autonomous driving vehicle and configured to monitor a state of a driver during autonomous driving; and
   a controller configured to:
   control, during the autonomous driving, movement of the steering wheel to achieve at least one of an upward/downward location, a leftward/rightward tilting angle, or an axial movement of the steering wheel of the autonomous driving vehicle, based on the state of the driver; and
   determine a sensitivity, by which the steering wheel is controlled, based on the state of the driver,
   wherein the sensitivity includes a magnitude of the steering wheel movement controlled by the controller; and
   wherein the controller is configured to increase or decrease the sensitivity based on the state of the driver.

2. The apparatus of claim 1, wherein the monitoring device detects a location of a head of the driver, and
   wherein the controller controls the leftward/rightward tilting angle of the steering wheel such that an axial direction of the steering wheel faces the location of the head of the driver.

3. The apparatus of claim 1, wherein the monitoring device detects a seating posture of the driver, and
   wherein the controller controls the axial movement of the steering wheel based on the seating posture of the driver.

4. The apparatus of claim 1, wherein the controller informs the driver of a request for switching of a control right by moving the steering wheel according to a preset motion when the switching of the control right of the driver is required.

5. The apparatus of claim 1, further comprising:
   a hands-off detector configured to detect a hands-off state of the driver, and
   wherein the controller controls at least one of the upward/downward location, the leftward/rightward tilting angle, or the axial movement of the steering wheel, based on the state of the driver, when the driver is in the hands-off state.

6. The apparatus of claim 1, wherein the monitoring device includes at least one of a camera, a carbon dioxide measuring sensor, a motion sensor, a seat position sensor, or a radar sensor.

7. The apparatus of claim 1, wherein the monitoring device detects a sleepiness state of the driver, and
   wherein the controller adjusts the upward/downward location of the steering wheel so that the steering wheel contacts a body of the driver when the sleepiness state of the driver is detected, when switching of a control right of the driver is required.

8. The apparatus of claim 1, wherein the controller determines the sensitivity, by which the steering wheel is controlled, based on at least one of a speed or an acceleration of the autonomous driving vehicle or an external driving environment according to surrounding vehicles, and controls at least one of the upward/downward location, the leftward/rightward tilting angle, or the axial direction of the steering wheel according to the sensitivity.

9. The apparatus of claim 1, wherein the controller outputs a preset signal through a display or a lamp provided in the steering wheel.

10. The apparatus of claim 9, wherein the controller adjusts the preset signal based on at least one of the external driving environment of the autonomous driving vehicle or the state of the driver.

11. A method for controlling a steering wheel, the method comprising:
    monitoring, by a monitoring device provided in an autonomous driving vehicle, a state of a driver during autonomous driving; and
    controlling, by a controller, during the autonomous driving, movement of the steering wheel to achieve at least one of an upward/downward location, a leftward/rightward tilting angle, or an axial movement of the steering wheel of the autonomous driving vehicle, based on the state of the driver; and
    determining, by the controller, a sensitivity, by which the steering wheel is controlled, based on the state of the driver;
    wherein the sensitivity includes a magnitude of the steering wheel movement controlled by the controller; and
    wherein the controller is configured to increase or decrease the sensitivity based on the state of the driver.

12. The method of claim 11, wherein monitoring the state of the driver by the monitoring device includes:
    detecting, by the monitoring device, a location of a head of the driver, and
    wherein the controlling of at least one of an upward/downward location, a leftward/rightward tilting angle, or an axial movement of the steering wheel of the autonomous driving vehicle by the controller includes:
    controlling, by the controller, the leftward/rightward tilting angle of the steering wheel such that an axial direction of the steering wheel faces the location of the head of the driver.

13. The method of claim 11, wherein monitoring the state of the driver by the monitoring device includes:
    detecting, by the monitoring device, a seating posture of the driver, and wherein the controlling of at least one of an upward/downward location, a leftward/rightward tilting angle, or an axial movement of the steering wheel of the autonomous driving vehicle by the controller includes:
controlling, by the controller, the axial movement of the steering wheel based on the seating posture of the driver.

14. The method of claim 11, wherein controlling the upward/downward location, the leftward/rightward tilting angle, or the axial movement of the steering wheel of the autonomous driving vehicle by the controller includes:
informing, by the controller, the driver of a request for switching of a control right by moving the steering wheel according to a preset motion when the switching of the control right of the driver is required.

15. The method of claim 11, further comprising:
detecting, by the hands-off detector, a hands-off state of the driver,
wherein the controlling of at least one of an upward/downward location, a leftward/rightward tilting angle, or an axial movement of the steering wheel of the autonomous driving vehicle by the controller includes:
controlling, by the controller, at least one of the upward/downward location, the leftward/rightward tilting angle, or the axial movement of the steering wheel, based on the state of the driver, when the driver is in the hands-off state.

16. The method of claim 11, wherein monitoring the state of the driver by the monitoring device includes:
detecting, by the monitoring device, a sleepiness state of the driver, and
wherein the controlling of at least one of an upward/downward location, a leftward/rightward tilting angle, or an axial movement of the steering wheel of the autonomous driving vehicle by the controller includes:
adjusting, by the controller, the upward/downward location of the steering wheel so that the steering wheel contacts a body of the driver when the sleepiness state of the driver is detected, when switching of a control right of the driver is required.

17. The method of claim 11, wherein controlling the upward/downward location, the leftward/rightward tilting angle, or the axial movement of the steering wheel of the autonomous driving vehicle by the controller includes:
determining, by the controller, the sensitivity, by which the steering wheel is controlled, based on at least one of a speed or an acceleration of the autonomous driving vehicle or an external driving environment according to surrounding vehicles; and
controlling, by the controller, at least one of the upward/downward location, the leftward/rightward tilting angle, or the axial direction of the steering wheel according to the sensitivity.

18. The method of claim 11, further comprising outputting, by the controller, a preset signal through a display or a lamp provided in the steering wheel.

* * * * *